United States Patent [19]

Horn

[11] Patent Number: 5,076,210

[45] Date of Patent: Dec. 31, 1991

[54] CAROUSEL WITH THE MULTIPLE REMOVABLE CAGES FOR DISPLAYING AND DISPENSING LIVE MARKET FISH FOR RETAIL SALE FROM AN AQUARIUM TANK

[76] Inventor: Clifford V. Horn, 457 Lakeview Way, Redwood City, Calif. 94062

[21] Appl. No.: 663,562

[22] Filed: Mar. 4, 1991

[51] Int. Cl.[5] .................................................. A01K 63/00
[52] U.S. Cl. .................................................................. 119/5
[58] Field of Search .................. 119/3, 5; 312/125, 135

[56] References Cited

U.S. PATENT DOCUMENTS

| | | | |
|---|---|---|---|
| 796,579 | 8/1905 | Jessop | 312/125 |
| 1,785,954 | 12/1930 | Hayes | 312/135 X |
| 3,302,615 | 2/1967 | Tietje | 119/15 |
| 3,374,770 | 3/1988 | Freudenberger | 119/3 |
| 3,548,786 | 12/1970 | Willinger | 119/5 |
| 3,699,921 | 10/1972 | Janicek | 119/5 |
| 3,727,579 | 4/1973 | Lee | 119/5 X |
| 3,877,420 | 4/1975 | Eagleson, Jr. | 119/15 |
| 4,028,245 | 6/1977 | Stahler | 119/3 X |
| 4,029,050 | 6/1977 | Genest | 119/5 |
| 4,357,902 | 11/1982 | Sheldon et al. | 119/3 X |

FOREIGN PATENT DOCUMENTS 2241240 3/1975 France ................................. 119/17

OTHER PUBLICATIONS

Washington Herald Magazine Article, "Educated Goldfish That Ride on a Ferris Wheel" Nov. 17, 1935, p. 6.

Primary Examiner—Robert P. Swiatek
Assistant Examiner—Nicholas D. Lucchesi
Attorney, Agent, or Firm—David E. Newhouse

[57] ABSTRACT

Apparatus for displaying and dispensing live market fish for retail sale includes a carousel for receiving, holding and moving a plurality of removable fish cages containing live market fish from a storage location, through a display location, to a dispensing position within a store based, water filled, open-top aquarium tank. Full fish cages are loaded onto the carousel within the aquarium and are sequentially emptied on a first-in-first-out basis as fish are purchased by consumers.

Each removable fish cage is a tubular structure formed by a longitudinal 'U'-shaped screen a hinged longitudinal transparent top and a structure at either end adapted for mounting onto the carousel. The carousel orients the transparent top of each mounted fish cage vertically at the display location and horizontally at the dispensing position.

The supporting distribution system includes a central processing center where live market fish are received in bulk and loaded into individual cages, a transport vehicle for carrying the loaded cages from the processing center to store based aquariums and cage transport pails for manually transferring the loaded fish cages from the transport vehicle to the carousel within the store aquarium.

14 Claims, 7 Drawing Sheets

CAROUSEL WITH THE MULTIPLE REMOVABLE CAGES FOR DISPLAYING AND DISPENSING LIVE MARKET FISH FOR RETAIL SALE FROM AN AQUARIUM TANK

BACKGROUND OF THE INVENTION

1. Field of the Invention

This invention relates generally to distribution of live market fish for retail sale, and in particular to apparatus for confining, displaying and dispensing live market fish from an aquarium in a retail environment.

2. Description of the Prior Art

Retail marketing of live market or table fish requires relatively spacious aquariums for storing, displaying and maintaining viability of an adequate fish inventory at the point of retail sale. For example, aquariums containing freshwater Australian "lobsters" are a common sight at large grocery chain stores. Such aquariums are typically divided into two or more compartments by one or more vertically oriented, plastic barricades which confine the lobsters yet minimally disrupt aeration and water circulation in the tank. Such vertical divisions within an aquarium presumptively allow the proprietor, the wholesale distributor and customers a means for differentiating between the respective groups of confined "lobsters" based upon shelf life or other such factors.

The primary disadvantages of such existing retail display aquariums relate to unavailability of tank capacity (space) to accept new fish inventory because of occupancy by older shelf life inventory, a reluctance to mix different species of fish together because of incompatibilities, and difficulty in effecting fish capture particularly as fish are removed from the tank or section thereof.

Other disadvantages relate to the inability of a proprietor to see into the aquarium via a disturbed water surface to effect capture of a particularly mobile piscene delight selected by a discerning customer, not to mention the reluctance of the proprietor to get wet.

In fact, the ability of table fish such as trout to elude capture even in modestly size aquarium tanks has discouraged both promotion and development of an extensive retail market for live trout in the United States despite the existence of a relatively large trout aquaculture industry.

SUMMARY OF THE INVENTION

A carousel apparatus for displaying and dispensing live market fish for retail sale is placed within a relatively spacious, open top aquarium located at a retail store. The carousel receives, holds and moves a plurality of removable fish cages, each containing a plurality of live market fish, from a storage location within the aquarium, through a display location proximate a front viewing wall of the aquarium, to a dispensing position at the top of the aquarium. At the dispensing position, the top of the cage is just above water surface. Full fish cages loaded onto the carousel within the aquarium are sequentially emptied, first-in-first-out, as fish are purchased by consumers.

Each fish cage comprises a trough structure formed by longitudinal 'U'-shaped screen structure with a transparent top secured by hinges along a longitudinal edge and a frame structure at either end. Latching mechanisms secured to the frame structures at each end of the tubular cages rigidly mount the cages to the carousel so that the transparent cage top is oriented vertically when the cage is located in the display position and horizontally when the cage is located at the dispensing position within the aquarium.

Another aspect of the described display and dispensing apparatus is that a removable tray can be placed bridging the gap between a side wall of the aquarium and a fish cage opened at the dispensing position to provide a bi-level trough which significantly eases the problems of fish capture, retention and handling. The upwardly extending, opened top of the fish cage and the end walls of the aquarium further help confine struggling fish to the bi-level trough.

Other aspects of the the invented system relate to a supporting wholesale distribution system which includes a processing center where live market fish are received in bulk, and are loaded into individual cages. Full fish cages are then loaded into a tank transport vehicle for conveying the full cages from the processing center to the store based aquariums. At the store, one or more full fish cages are manually transferred via a cage transport pail from the transport vehicle tank to the store's aquarium tank. At the same time, empty fish cages at the store are picked up and returned to the processing center for reuse by the transport vehicle.

Advantages of the invented system relate to minimization of tank capacity devoted to old shelf live inventory, a mechanism for promoting retail sale of the live fish on a "first-in-first-out" basis, and storage and sale of incompatible market fish species from different cages within a single aquarium tank.

DESCRIPTION OF PREFERRED AND EXEMPLARY EMBODIMENTS

Figure 1:
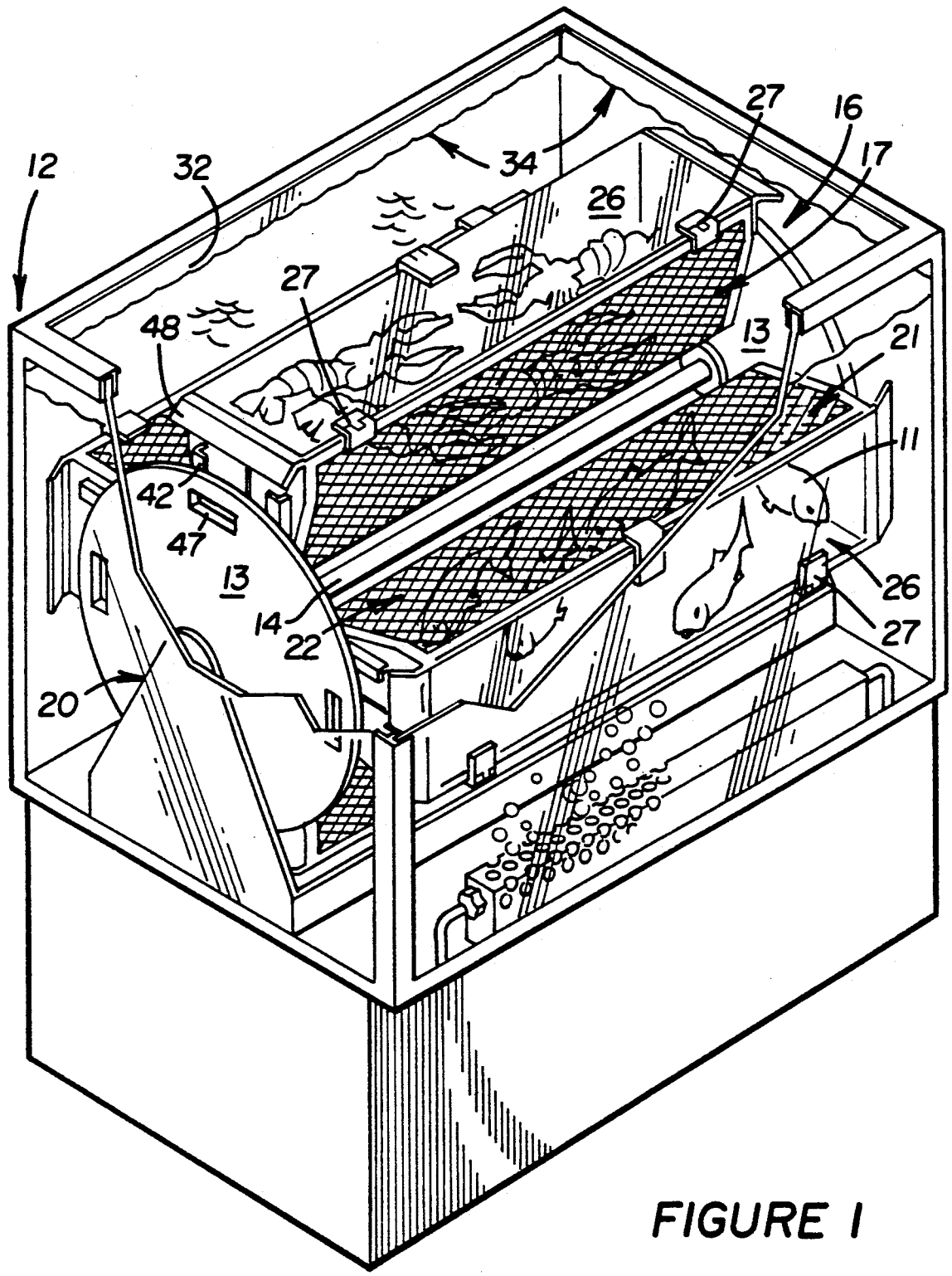
FIGS. 1 and 1a are perspective views of an open top aquarium equipped with different embodiments of the invented carousel apparatus for displaying and dispensing live market fish for retail sale.
Figure 1A:
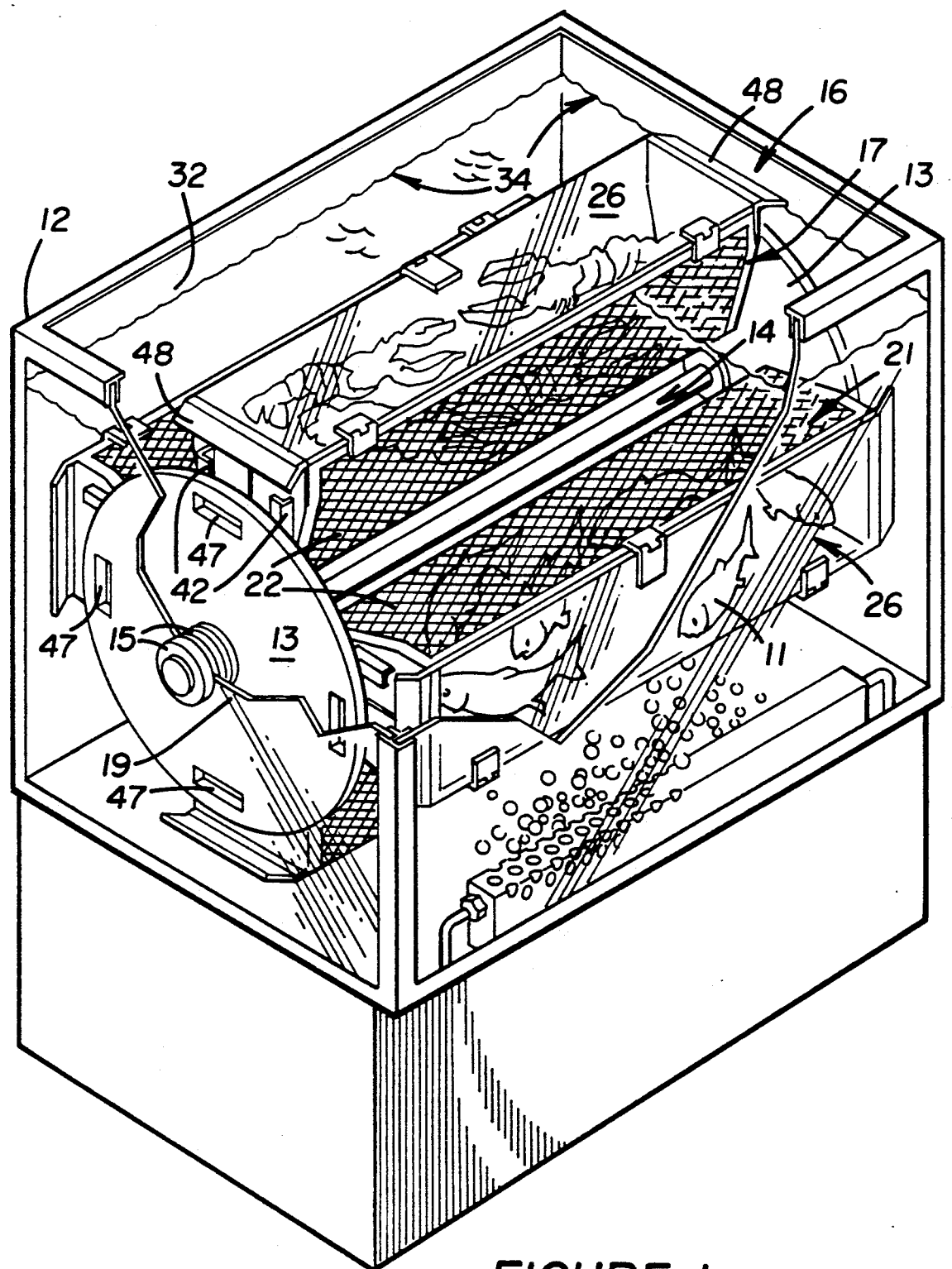

As shown in FIGS. 1 and 1a, the invented apparatus for displaying and dispensing live market fish 11 from a water filled, open-top aquarium tank 12 includes a pair of circular plates 13 keyed to opposite ends of a common horizontal axle 14 to provide a carousel frame 16.

A plurality of fish cages 17 are releasably coupled between the plates 13 of the carousel frame 16. As illustrated in FIG. 1, the axle 14 of the carousel is supported for rotation by a pedestal structure 20 resting on the bottom of the tank 12. Alternatively, as shown in FIG. 1a, the axle 14 is supported for rotation by the end walls 19 of the tank 12, provided the the walls 19 are composed of an appropriate structural material. And, where the ends of the axle penetrate through the end walls 19 of the tank 12, appropriate seals 15 are employed to prevent water leakage.

Referring to FIG. 3-6, each individual fish cage 17 comprises a trough 21 formed by longitudinal screen 22 held in a 'U' shape by a frame structure 23 and end walls 24. A transparent top 26 is secured by hinges 27 along the top front longitudinal edge of the screen trough 21. The coupling mechanisms 28 secured to the exterior surface of the trough end walls 24 engage cooperating structures 29 secured to the carousel plates 13 which prevent the cages 17 from revolving as the carousel rotates.

For proper operation, the closed transparent tops 26 of the cages 17 are oriented horizontally when a particular cage 17 is held at the dispensing position by the carousel 16. This means that the transparent cage top 26 is vertically oriented when a particular cage 17 is held at the display location within the aquarium 12 proximate the front wall of the aquarium 12. Accordingly discerning patrons are afforded an unimpeded view of the cage contents.

Figures 2, 2A:
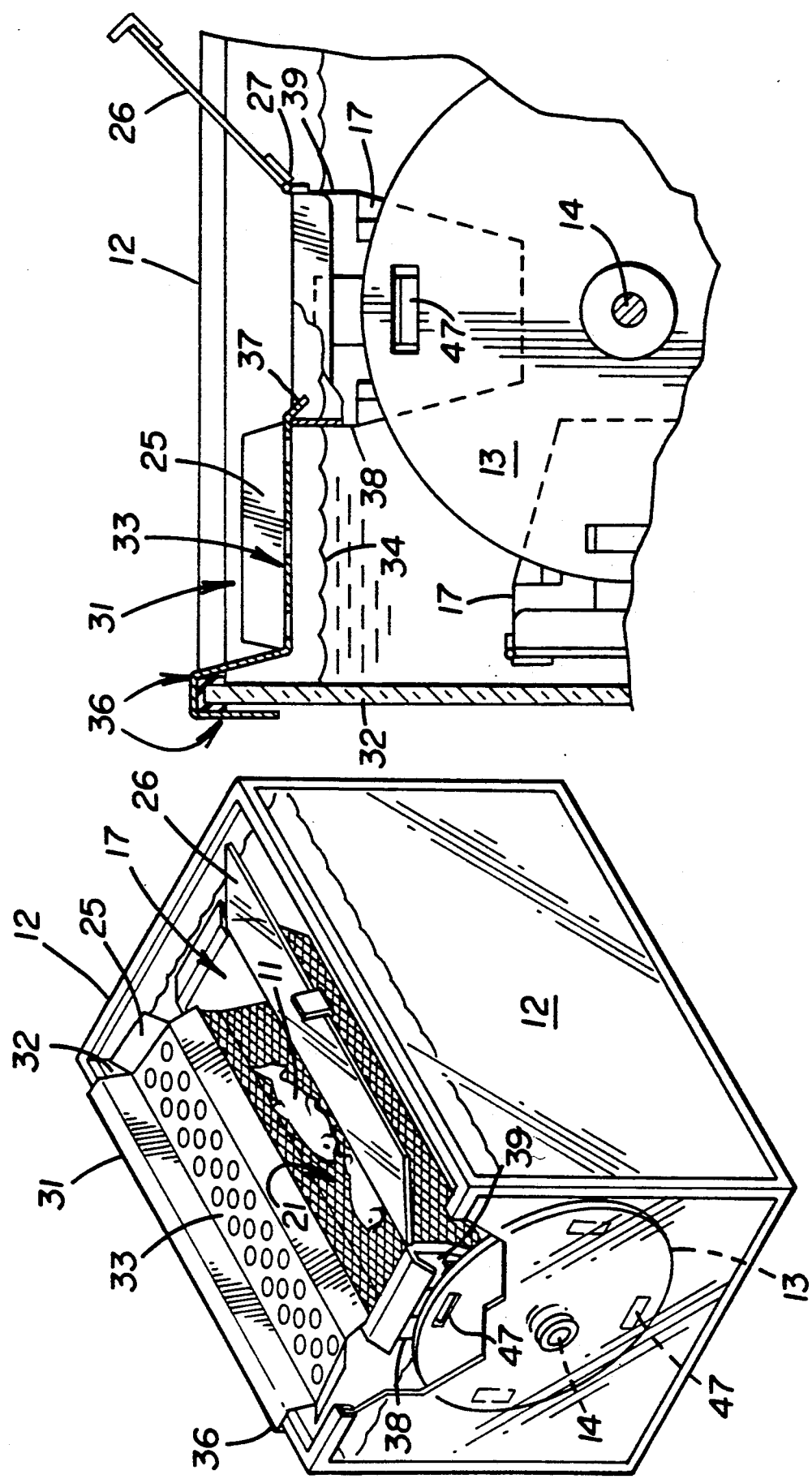
FIGS. 2 and 2a illustrated the bi-level trough defined by the combination of the removable tray, the side walls of the aquarium, and an opened fish cage for dispensing fish at the water surface within the aquarium.
Figure 3:
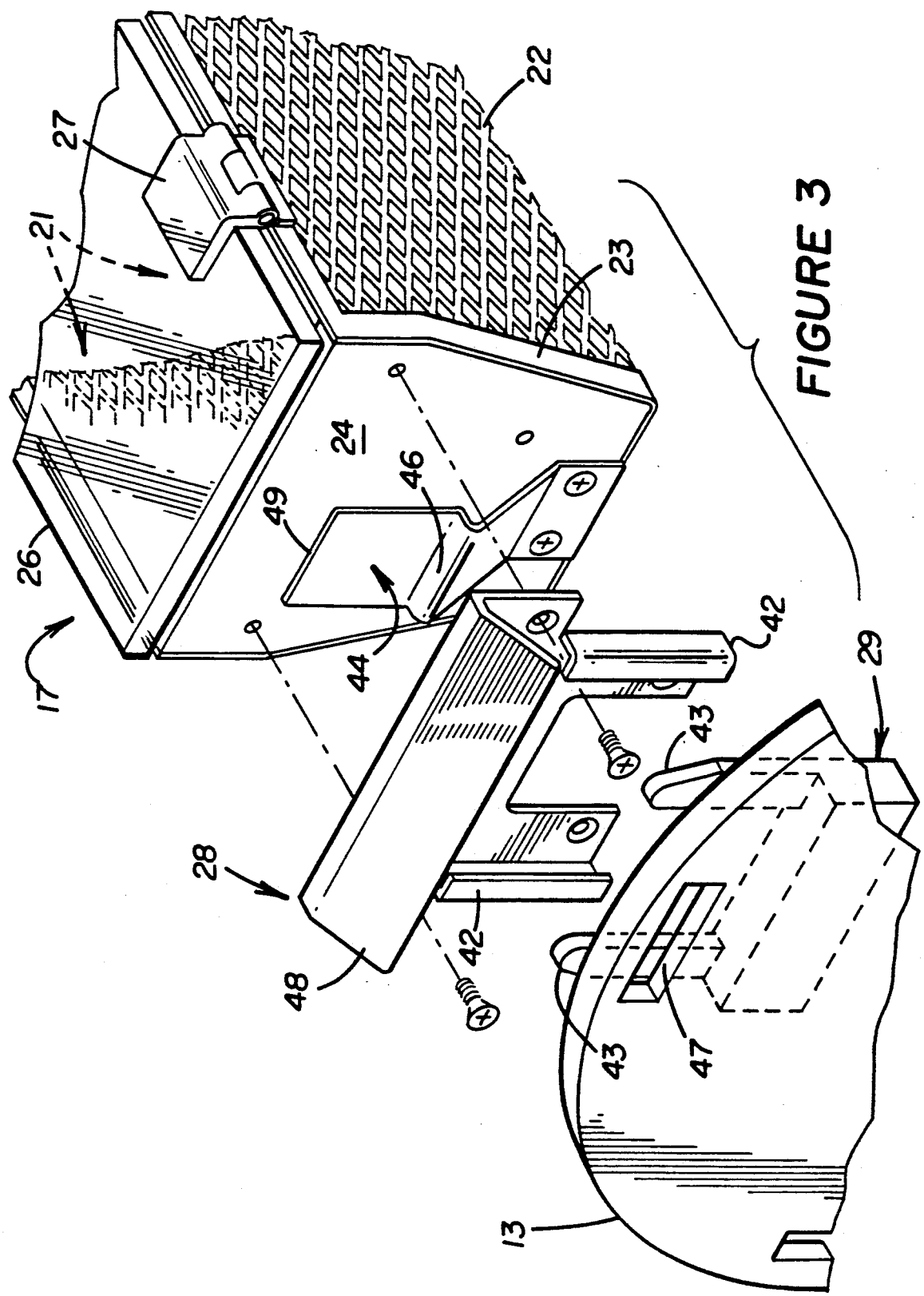
FIG. 3 is an exploded perspective view of one end of a fish cage for the invented apparatus, illustrating the details and components of the coupling between the cage and the carousel.
Figure 4:
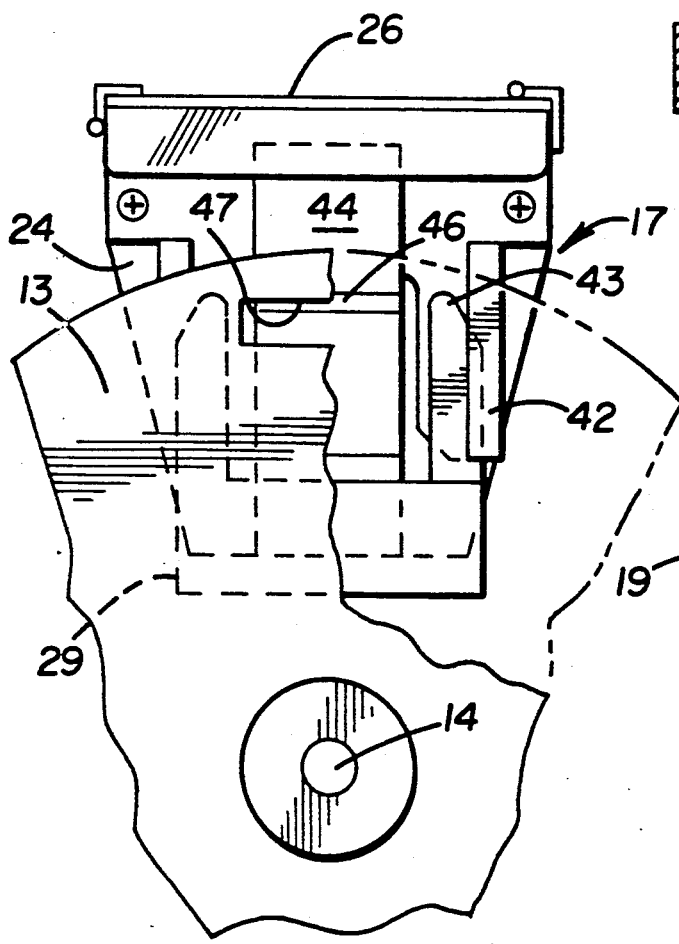
FIG. 4 is an end elevation view of an individual fish cage supported by the carousel at the dispensing position.

Referring to FIGS. 2 and 2a, a removeable tray 31 is hung from the back longitudinal side wall 32 of the aquarium 12 to provide a perforated platform surface 33 above the water surface 34 in the aquarium 12. In particular, the back edge 36 of the tray 31 is formed into inverted channel dimensioned to receive the side wall 32 of the aquarium 12. The front longitudinal lip 37 of the tray 31 is bent and extends downward from the platform surface 33 at an angle into the interior of the fish cage 17. In effect, the removable tray 31 bridges the distance between the side wall 32 of the aquarium 12 and the front edge 38 of the cage 17. The removable tray 31 has end flanges 25 which extend upwardly at an angle from the tray platform 33 to bridge the distance from the tray to the sidewalls 32 of the aquarium 12. The transparent cage top 26 opens and extends upwardly at an angle, pivoting on hinges 27 fastened to the back edge 39 of the cage 17. By proper dimensioning, the combination of the upwardly extending cage top 26, the perforated platform 33 of the tray 31, and the aquarium sidewalls 32 functions as an enclosure above the water surface 34 for confining a struggling live fish retrieved from the cage interior 21.

It should also be appreciated that the water surface 34 should be sufficiently below the top of the fish cage 17 at the dispensing position that the fish confined in the cage cannot escape when struggling to avoid capture. In fact, it is possible to adjust the vertical position of the cage 17 upwardly at the dispensing position relative to the water surface 34 to decrease the underwater volume of the cage available to the fish to elude capture.

Figure 5:
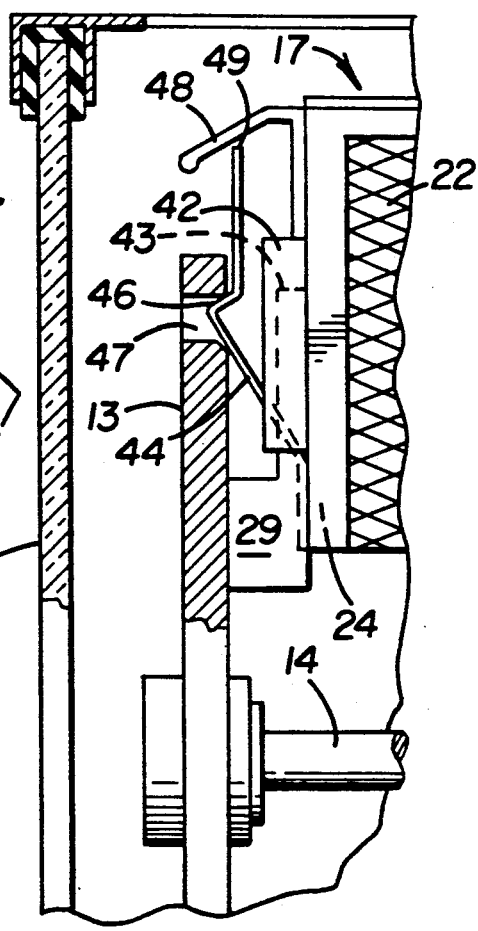
FIG. 5 is a side elevation view illustrating details of the mechanisms coupling between the fish cage and carousel.

In particular, as shown in FIGS. 3 thru 6 the coupling mechanism 28 secured to the cage ends 24 includes a 'C' channel element 42 slideably receiving and capturing extending, spaced apart prongs 43 of a cooperating coupling structure 29 fastened to the carousel plates 13. A resilient latch tongue 44 fastened at its base to the bottom of the fish cage end 24 extends outwardly at an angle from the face of the cage end 24, within the 'C' channel element 42 and provides a stepped surface 46 adapted to engage receptacle lands 47 cut into (or through) the proximal surface 48 of the carousel plate 13 between the extending prongs 43 of the cooperating coupling structure 29. (FIG. 5)

Figure 6:
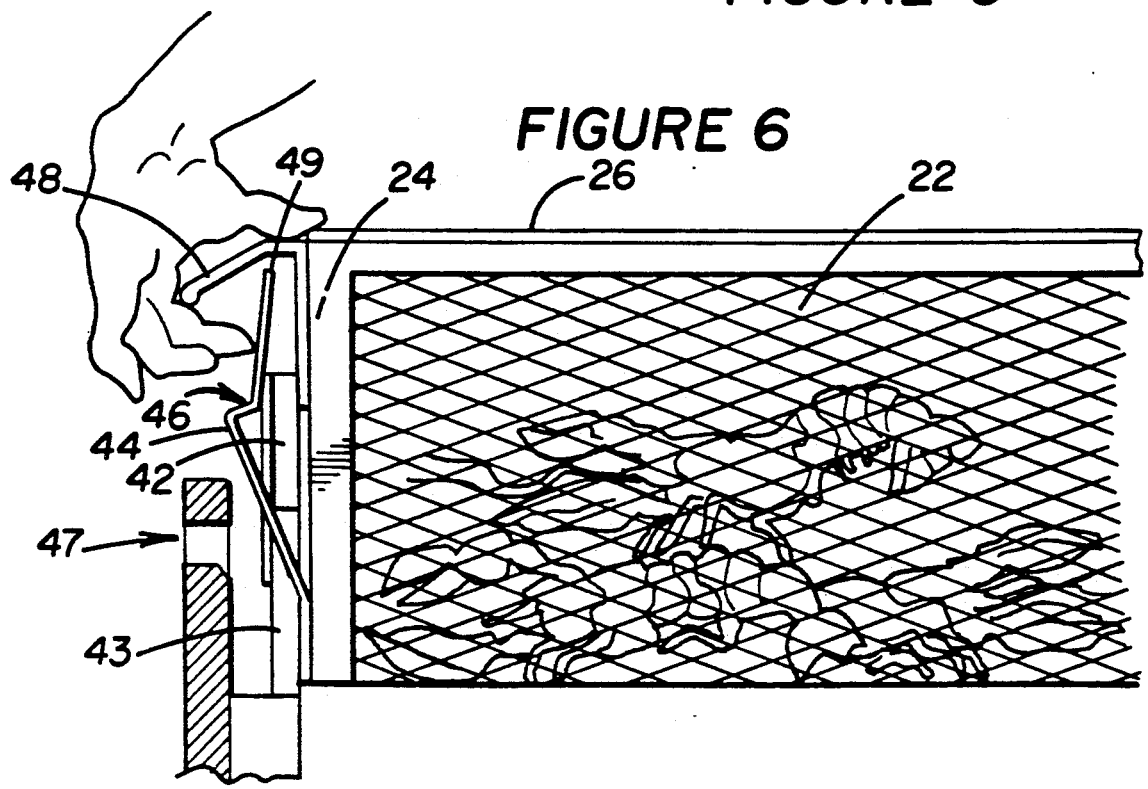
FIG. 6 is a side elevation view illustrating disengagement of the mechanisms coupling between the fish cage and carousel.

To disengage the step 46 of the tongue latch 44 from the receptacle land 47, the distal end 49 of the latch tongue 44 is manually pressed inwardly toward the face of the cage end 24 as illustrated in FIG. 6. Each 'C'-channel element 42 includes an integral handle 48 extending downward at an angle relative to the face of the cage end 24. The handles 48 at either end of the cages 17 are oriented perpendicularly relative to both the respective 'C'-channel and the (longitudinal) axis of the cage 17.

At the dispensing position, illustrated in FIGS. 3-6, the prongs 43 of the cooperating structure 29 extend vertically. Accordingly, by releasing engagement of the step 46 of the resilient latch tongue 44 with the receptacle lands 47, it is possible to slide the fish cage 17 upwardly. (See FIG. 6) Once the cage 17 is raised sufficiently, the latch tongue 44 is released and springs outward to seat on the circumferential edge of the carousel plate 13 holding the the cage 17 in the raised position. It should be appreciated, that a row of receptacle lands 47 could be cut into or through the proximal surface of the carousel plates 13 to provide a plurality of vertical positions for the cages 16 at the dispensing position.

Figure 7:
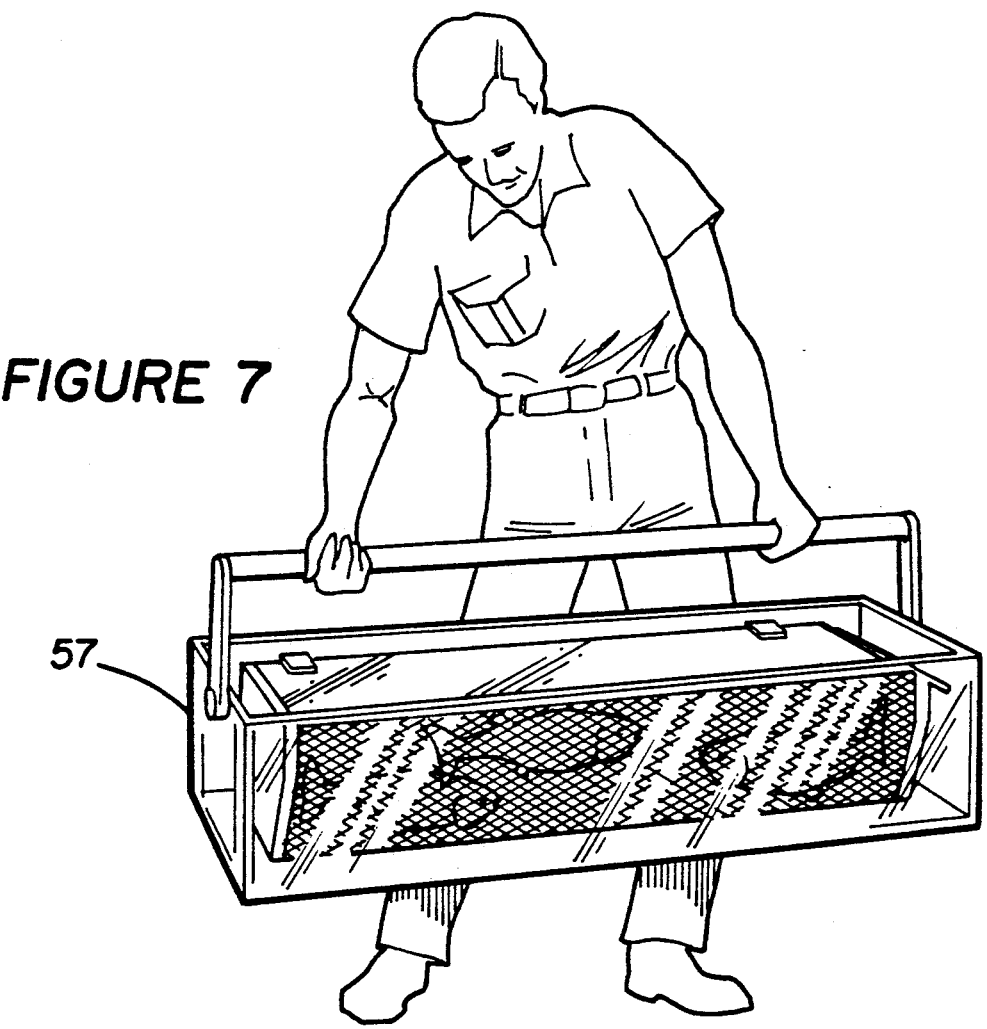
FIG. 7 illustrates manual transport of an fish cage using a transport pail.
Figure 8:
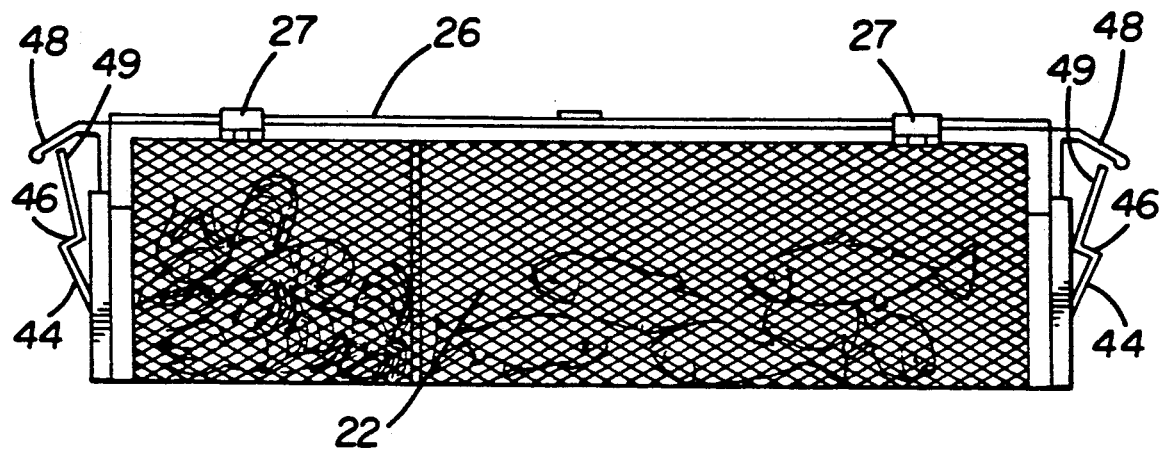
FIG. 8 illustrates a divided fish cage.
Figure 9:
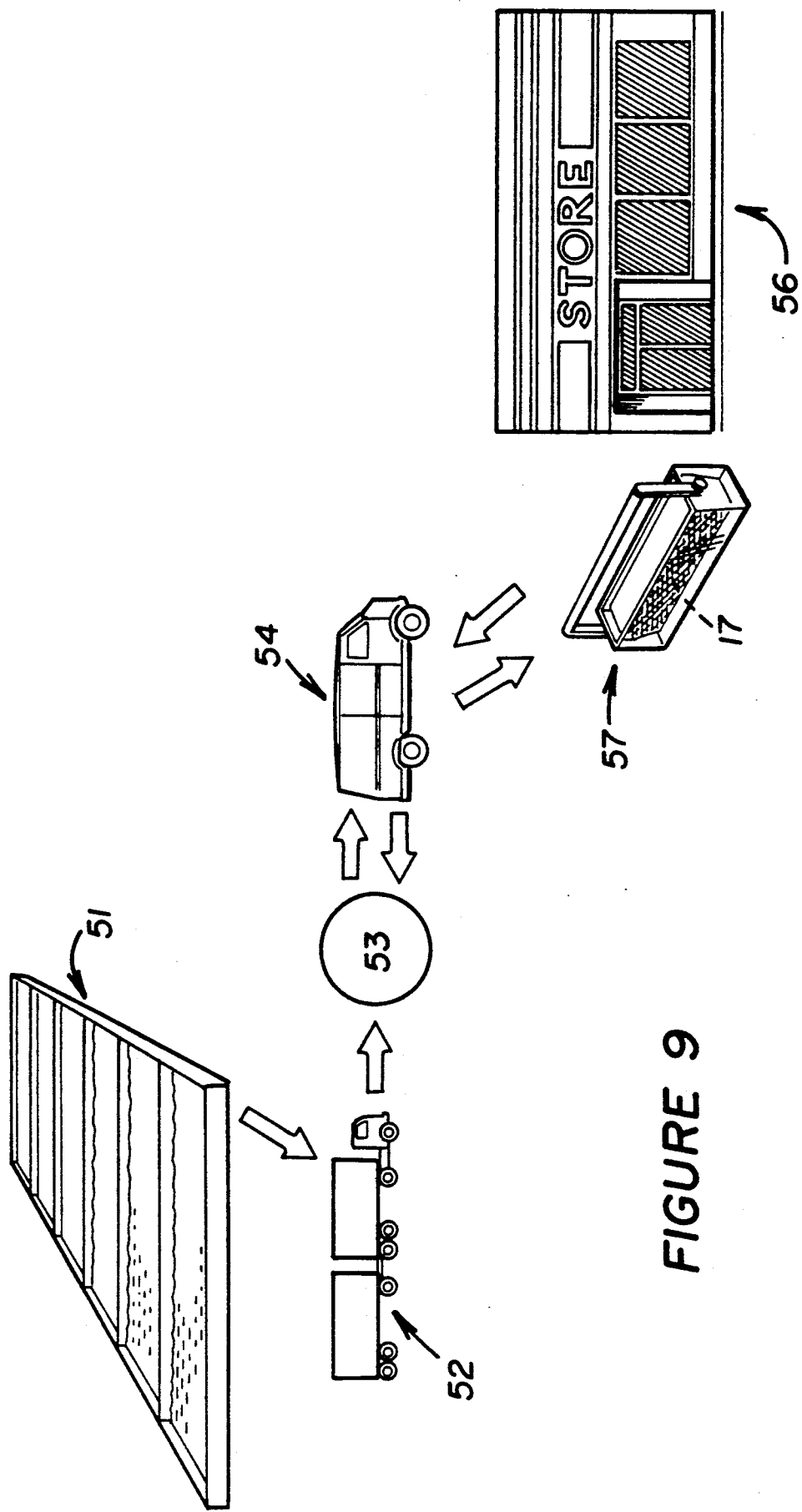
FIG. 9 is a schematic illustration of the supporting wholesale distribution system.

Referring now to the schematic of FIG. 9, the supporting wholesale distribution system includes aquaculture farms 51 where the live market fish are raised, a tank transport vehicle 52 for transporting the fish, in bulk from the farms 51 to a central processing facility 53 where the fish 11 are stored live and loaded into individual cages 17. A van 54 transports the loaded cages 17 immersed in water from the processing center to store based aquariums 56. The loaded fish cages 17 are transferred from the van 54 to the aquarium within the store using manual transport pails 57 (See FIG. 7) which contain enough water to mitigate stress on the fish 11 but not so much as to render the transport pail 57 unwieldily because of the weight and instability of sloshing water. Conventional wheeled platform dollies should be used for moving the transport pails 57 from the van 54 to the aquarium 56 in the store.

Once in the store, with reference to FIGS. 1-6, the empty fish cages 17 are removed from the aquarium 12 by rotating each empty cage 17 to the dispensing position and manually depressing distal ends 49 of the tongue latches 44 at either end of the cage 17 disengaging the cage from the carousel and lifting the cage out. A loaded fish cage 17 is then quickly lifted from the transport pail 57 and inserted into the just vacated location on the carousel. It should be appreciated that the fish 11 will be without water as the cage 17 is moved from the transport pail 57 to the carousel. Accordingly, it is desirable to minimize the time of transfer of the loaded fish cage 17 from the transport pail 57 to the carousel within the aquarium 12.

The empty cages 17 removed from the carousel are returned via the van 54 to the central processing center 53, reloaded with fish and again transported to another store based aquarium 56.

I claim:

1. An apparatus for displaying and dispensing live market fish for retail sale comprising in combination, a. a water filled, open-top aquarium having a transparent vertical front wall;

b. a plurality of fish cages for confining and containing live market fish, each cage having means for allowing access into its interior and having a window means for allowing unimpeded view of the fish confined within the cage;

c. a carousel means located within the water filled aquarium for removeably receiving, supporting and moving a plurality of fish cages within the aquarium, the carousel means moving each supported cage from a storage location within the aquarium, through a display location proximate the transparent vertical front wall of the aquarium, to a dispensing position at a water surface proximate the open top of the aquarium; and d. latching means for securing each fish cage to the carousel; whereby, fish cages, filled with live fish, are loaded onto the carousel within the aquarium and are sequentially emptied on a first-in-first-out basis as fish are purchased by consumers.

2. The apparatus of claim 1 wherein each fish cage is a longitudinal tubular structure formed by a longitudinal 'U'-shaped screen structure, a longitudinal planer top member capping the 'U'-shaped screen structure and end frame members closing either end of the tubular structure.

3. The apparatus of claim 2 wherein the window means of each fish cage is a transparent longitudinal planar top member capping the 'U'-shaped screen structure, and wherein the means for allowing access into the cage interior comprises hinge means coupling between a longitudinal edge of the top member and a longitudinal side of the 'U'-shaped screen structure for permitting the top member to be pivoted upwardly allowing access into the cage interior, and further including means for releasably securing the remaining longitudinal edge of the top member to the remaining longitudinal side of the 'U'-shaped screen structure.

4. The apparatus of claim 3 wherein the carousel means orients the transparent top member of each supported fish cage vertically at the display location within the aquarium for allowing consumers to view fish within the cage.

5. The apparatus of claim 4 wherein the carousel means orients the transparent top member of each supported fish cage horizontally above water surface at the dispensing position within the aquarium upon rotating the cage from the display position to the dispensing position.

6. The apparatus of claim 5 wherein the carousel means rotates the supported fish cages about a horizontal rotational axis lying in a plane parallel to the transparent vertical front wall of the aquarium, and wherein the tubular fish cages are supported by the carousel means with their respective longitudinal axes in parallel alignment with the rotational axis, and wherein the latching means for securing each cage to the carousel further includes means for preventing relative rotation between each cage and the carousel means.

7. The apparatus of claim 3 wherein the carousel means comprises in combination, a. an axle supported for horizontal rotation within the aquarium;

b. a pair of circular members each mounted proximate an end of the axle and keyed to and coaxially rotatable with the axle, c. fish cage mounting structures carried by each circular member, each mounting structure angularly registering and aligning with a mounting structure on the other circular member;

d. a cooperating engagement structure at the respective ends of each tubular fish cage carried by the end frame members adapted to receive and couple with the fish cage mounting structures carried by the circular members, whereby, a plurality of tubular fish cages are supported between the circular members aligned parallel to the axle of the carousel means.

8. The apparatus of claim 7 wherein each mounting structure on each circular member includes a base element secured to the circular member proximate its peripheral edge on its inside face and a prong element extending from the base element toward the peripheral edge of the circular member for providing two parallel rails spaced away from the inside face of the circular member; and wherein the cooperating engagement structure at the respective ends of each fish cage comprises a 'C'-channel element secured to the end frame member on its exterior surface providing a 'C'-channel dimensioned for slideably receiving and engaging the parallel rails provided by each prong element, the base element of the mounting structure functioning as a mechanical stop preventing the respective 'C'-channel element from sliding radially inwardly toward the carousel axle and out of engagement with the rails of the prong element, whereby, the cooperating engagement of the respective 'C'-channels at the ends of the fish cages with the particular parallel rails of the prong elements carried by the pair of circular members rigidly orients each mounted fish cage with its transparent top member facing outwardly relative to the carousel axle.

9. The apparatus of claim 8 wherein the latching means for securing each fish cage to the carousel comprises in combination, a. a pair of resilient latch tongues each fastened at its base to an end frame member at the opposite ends of the fish cage, each latch tongue extending upwardly and outwardly at an angle from the end frame member toward the top member of the fish cage to provide a stepped surface perpendicularly oriented with respect to the 'C'-channel of the particular 'C'-channel element secure to that end frame member, and b. engagement lands carried by the circular members each land providing a strike surface oriented perpendicularly with respect to the rails of a particular prong element carried on the inside faces of the respective circular members, the strike surfaces of the engagement lands being located for engaging the stepped surfaces of the latch tongues extending outwardly from the opposite ends of a particular fish cage mounted between the pair of circular members of the carousel means, whereby, engagement of the stepped surfaces of the latch tongues at either end of a fish cage with the strike surfaces of the corresponding lands prevents a mounted fish cage from sliding radially outward relative to the carousel axle.

10. The apparatus of claim 9 wherein each extending resilient latch tongue has an extending distal end which can be depressed inwardly toward the end frame member of the fish cage for releasing engagement of the stepped surface with the strike surface of the corresponding engagement land, whereby, simultaneously depression of the extending distal ends of the respective latch tongues at the respective ends of a tubular fish cage, allows that fish cage to be slid radially outward and removed from the carousel means.

11. The apparatus of claim 10 wherein each tubular fish cage further includes a lifting handle secured to each end frame members, and the extending distal ends of the resilient latch tongues are located to enable a person to simultaneously grasp a handle and depress the distal end of the latch tongue inwardly.

12. The apparatus of claim 11 wherein each prong element provides a pair of spaced apart prongs each prong providing one rail for slideable engagement within one 'C'-channel of the corresponding 'C'-channel element, and wherein the resilient latch tongue extends upwardly and outwardly at an angle between the respective channels of the 'C'-channel element, and wherein the engagement lands comprise receptacles cut into the inside face of the circular members between the extending pair of prongs of the prong element, each receptacle being shaped to receive and provide a strike surface for the stepped surface of a resilient latch tongue.

13. The apparatus of claim 3 and further including a removable tray means for providing a longitudinal planar capture surface above water surface within the aquarium between a back wall of the aquarium and a tubular fish cage held at the display position when its transparent top member is pivoted upwardly to allow access into the cage interior, the tray means mechanically bridging between the back wall of the aquarium and the remaining longitudinal side of the 'U'-shaped screen structure of the fish cage.

14. A method of distributing live market fish for retail sale comprising the steps of:

receiving live market fish immersed in water in bulk from an aquaculture source at a centrally located storage and processing facility;

loading live market fish received at the centrally located storage and processing facility into a plurality of tubular fish cages, each loaded cage being immersed in water and having means for allowing access into its interior, openings for allowing water to circulate through its interior and a window means for allowing an unimpeded view of the fish confined within the cage;

transporting by vehicle the plurality of loaded tubular fish cages immersed in water from the processing center to stores having open top tank aquariums, transferring manually, a loaded fish cage utilizing a cage transport pail for keeping the loaded fish cage immersed in water from the transport vehicle to a carousel apparatus immersed in an aquarium at a store, the fish cage being adapted for mounting onto and removal from the carousel apparatus, removing empty fish cages from the carousel apparatus immersed in the store aquarium, mounting loaded fish cages onto the carousel apparatus immersed in the store aquarium, rotating the carousel apparatus for sequentially displaying and dispensing fish from the loaded fish cages mounted thereon in like order as the loaded cages were mounted on the carousel apparatus, and transporting by the same vehicle empty fish cages from the store based aquariums back to the central processing facility.

* * * * *